US006998085B2

(12) United States Patent
De Winter et al.

(10) Patent No.: US 6,998,085 B2
(45) Date of Patent: Feb. 14, 2006

(54) PROCESS FOR THE PRODUCTION OF A LAYER PART, IN PARTICULAR A REACTION INJECTION MOULDING PROCESS FOR THE PRODUCTION OF A POLYURETHANE SKIN LAYER

(75) Inventors: Hugo De Winter, Wetteren (BE); Yvan Vanluchene Yvan, Wetteren (BE)

(73) Assignee: Recticel, Brussels (BE)

( * ) Notice: Subject to any disclaimer, the term of this patent is extended or adjusted under 35 U.S.C. 154(b) by 325 days.

(21) Appl. No.: 10/343,224

(22) PCT Filed: Jul. 31, 2001

(86) PCT No.: PCT/BE01/00125

§ 371 (c)(1),
(2), (4) Date: Mar. 4, 2003

(87) PCT Pub. No.: WO02/11974

PCT Pub. Date: Feb. 14, 2002

(65) Prior Publication Data

US 2003/0164576 A1 Sep. 4, 2003

(30) Foreign Application Priority Data

Aug. 3, 2000 (EP) ................................. 00870172

(51) Int. Cl.
*B29C 45/03* (2006.01)
*B29C 45/16* (2006.01)

(52) U.S. Cl. ...................... 264/255; 264/266; 264/316; 264/318; 264/338; 425/127; 425/129.1; 425/543; 425/577

(58) Field of Classification Search ................ 264/266, 264/255, 250, 313, 316, 318, 328.1, 338, 264/264; 425/127, 129.1, 577, 543
See application file for complete search history.

(56) References Cited

U.S. PATENT DOCUMENTS 3,883,629 A 5/1975 Garner et al.

(Continued)

FOREIGN PATENT DOCUMENTS

DE 20 20 335 A1 12/1971

(Continued)

OTHER PUBLICATIONS

Patent Abstracts of Japan, vol. 006, No. 146, Aug. 5, 1982, & JP 57 066941 (Nissha Printing Co., Ltd.) Apr. 23, 1982.

(Continued)

*Primary Examiner*—Edmund H. Lee
(74) *Attorney, Agent, or Firm*—Sughrue Mion, PLLC

(57) ABSTRACT

A process for the production by a moulding process of a micro-cellular or non-cellular elastomeric polyurethane skin layer or, more generally, to a process for the production of a composite comprising a first layer shaped part, which is made by a moulding process from a polyurethane reaction mixture, and a second layer shaped part which is adhered to the first part to form the composite. In order to avoid the use of release agents on the back side of the first layer shaped part, and thus the negative effect on the adhesion of the second layer shaped part, and the penetration of reaction mixture on this back side between the slides (9–10) of the mould, the mould surface (4) is covered on the back side of the moulding with a removable flexible covering (12), with a removable rigid pre-shaped covering or with a permanent non-stick coating layer.

16 Claims, 6 Drawing Sheets

U.S. PATENT DOCUMENTS

| | | | | | |
|---|---|---|---|---|---|
| 4,956,141 | A | * | 9/1990 | Allen et al. | 264/297.2 |
| 5,000,903 | A | | 3/1991 | Matzinger et al. | |
| 5,082,609 | A | | 1/1992 | Rohrlach et al. | |
| 5,728,333 | A | | 3/1998 | Tabata et al. | |

FOREIGN PATENT DOCUMENTS

| | | | | |
|---|---|---|---|---|
| DE | 39 18 389 | A1 | | 12/1990 |
| DE | 195 21 315 | A1 | | 12/1996 |
| DE | 197 31 780 | A1 | | 1/1999 |
| DE | 198 34 747 | A1 | | 2/2000 |
| EP | 650 822 | A1 | | 5/1995 |
| GB | 1 384 061 | A1 | | 2/1975 |
| GB | 1 486 769 | A1 | | 9/1977 |
| JP | 11129295 | A | * | 5/1999 |
| WO | WO 93 23237 | A1 | | 11/1993 |
| WO | WO 95 32850 | A1 | | 12/1995 |
| WO | WO 99 01270 | A1 | | 1/1999 |

OTHER PUBLICATIONS

Patent Abstracts of Japan, vol. 005, No. 119, Jul. 13, 1981 & JP 56 058844 (Toppan Printing Co., Ltd.) May 22, 1981.

* cited by examiner

PROCESS FOR THE PRODUCTION OF A LAYER PART, IN PARTICULAR A REACTION INJECTION MOULDING PROCESS FOR THE PRODUCTION OF A POLYURETHANE SKIN LAYER

BACKGROUND OF THE INVENTION

The present invention relates to a process for the production, by a moulding process as defined in the preamble of claim 1, in particular a reaction injection moulding process (RIM process), of a micro-cellular or non-cellular elastomeric polyurethane skin layer, which usually has to be provided with a backing layer to form a composite or, more generally, to a process as defined in the preamble of claim 2 for the production of a composite comprising a first layer shaped part, which is made by a moulding process from a polyurethane reaction mixture, and a second layer shaped part which is adhered to the first part to form the composite. The first layer shaped part, in particular the skin layer, is made by injecting or pouring a polyurethane reaction mixture in a closed mould having first and second co-operating mould sections so that the back side of this first part is formed on the side of the second mould section.

In most prior art methods for producing such moulded first parts, in particular moulded skins, use has to be made of so-called internal or external release agents in order to avoid sticking of the produced part, in particular the back thereof, to the mould surface or in other words to enable the produced part to be removed from the mould. Internal release agents are products incorporated in the reaction mixture to reduce the adhesion of the produced part to the mould while external release agents are products like waxes applied to the mould surface also to reduce the adhesion. A drawback of these known methods is that the release agents do not only reduce the adhesion of the produced part to the mould surface but they also reduce the adhesion of backing layers which are subsequently applied to the back of the produced layer shaped parts. In case of an elastomeric skin layer, these backing layers may for example be a foam layer in order to provide a soft touch. However, the moulded part itself may also be a foam layer, either with or without an integral skin, and the backing layer a rigid support layer.

An existing technique wherein the disadvantage of the reduced adhesion is avoided is disclosed in WO 93/23237 in the name of the present applicant. According to this known technique, a self-supporting synthetic trim part comprising an elastomeric polyurethane skin, a rigid synthetic carrier and a polyurethane foam layer between the skin and the carrier is produced by spraying, in a first step, a reaction mixture for the elastomeric skin against a mould surface and, in a second step, a reaction mixture for the foam layer against the back of the elastomeric skin. The carrier is then formed in situ against the back of the foam layer by a spray or a RIM process. As a result of the spray steps, no external release agents have to be applied to the back of the elastomeric skin or to the back of the foam layer so that a good adhesion can be obtained between the skin layer and the foam layer and between the foam layer and the synthetic carrier.

DE-A-198 34 747 also discloses a process for moulding synthetic skins wherein no release agent has to be used. In this known process a foil is applied over the concave bottom mould section and stretched by means of the upper mould section when lowering this mould section into the bottom mould section. A synthetic cast material is then cast into the mould cavity formed between the foil and the surface of the bottom mould section. After having moulded the synthetic skin, the foil can be maintained on the back thereof when it adheres to the skin or it can be removed therefrom when it does not adhere to the skin. A polyurethane foil adheres for example to a polyurethane skin whilst a polyethylene or a polypropylene foil does not. A drawback of the known process is that the foil can only be used once so that for each moulding a new piece of foil has to be fixed onto the mould. This does not only generate additional waste but complicates also the moulding process.

SUMMARY OF THE INVENTION

An object of the present invention is now to provide an alternative process wherein the first polyurethane part can be produced by a RIM or pouring process instead of by a spray process without necessarily reducing the adhesion of a subsequently applied backing layer as a consequence of the use of release agents and without having to use for each moulding a new piece of foil.

To this end, the process according to the invention is characterised in that the surface of the second mould section is covered with a non-stick covering which is either removable from the second mould section or which comprises a permanent non-stick coating layer applied onto the surface of the second mould section, the removable covering comprising either a flexible, elastically deformable sheet material which is pre-shaped to conform at least generally to the shape of said mould cavity or a rigid material pre-shaped in accordance to the shape of the mould cavity, and in that said reaction mixture is applied in the mould cavity between said covering and the surface of the first mould section.

Due to the fact that the surface of the second mould section is covered with a non-stick covering, no internal or external release agents have to be used to avoid adherence of the produced first part to the surface of the second mould section. In contrast to the covering, i.e. the foil, used in the process disclosed in DE-A-198 34 747 the covering used in the process according to the present invention can be used for several mouldings. The covering may first of all comprise a flexibel, elastically deformable sheet material which is pre-shaped to conform at least generally to the shape of the mould cavity. Due to its elasticity, this covering returns each time substantially again to its initial shape. The covering is pre-shaped so that no or less stretching is required to conform to the shape of the mould cavity thereby increasing the life time of the covering. The life time of the covering is also increased when using a rigid covering which is pre-shaped in accordance to the shape of the mould cavity. Instead of covering the surface of the second mould section with a flexible or rigid removable covering, it can also be covered with a permanent non-stick coating layer which adheres to the second mould surface. In this way, the same result is obtained, i.e. the second mould surface has also not to be coated with an external mould release agent to prevent the moulded part from adhering or sticking thereto and it is not necessary to apply a new covering for each moulding. It should be noted that the term “permanent” is not to be understood as meaning absolutely permanent but it only indicates that the non-stick layer remains on the mould surface when demoulding the moulded part so that it can be used for several hundreds or thousands or even more mouldings, depending on the wear properties of the coating.

An additional advantage of the process according to the invention is obtained when the second mould section is composed of at least two slides defining the surface of this second mould section. In this case, the provision of the removable covering or the permanent non-stick coating on the mould surface prevents the reaction mixture from penetrating partially between the slides, especially when the permanent non-stick coating is also applied on the lateral, mutually engaging sides of the slides. In this way, the slides have no longer to be cleaned, or at least less regularly, and further no burrs or flashes have to be removed from the back of the moulded part. Especially in the case of an elastomeric skin, the presence of burrs on the back side can not be tolerated since, at the location of these burrs, the backing layer does not adhere to the skin so that the skin may form unacceptable blisters.

The invention also relates to a mould for use in the process according to the invention as described hereabove and comprising at least first and second co-operating mould sections having opposing surfaces which co-operate to provide a mould cavity arranged to mould said first part therein, the second mould section being situated on the back side of first part. The mould is characterised in that the surface of the second mould section is covered with a non-stick covering which is either removable from the second mould section or which comprises a permanent non-stick coating layer applied onto the surface of the second mould section, the removable covering comprising either a flexible, elastically deformable sheet material which is pre-shaped to conform at least generally to the shape of said mould cavity or a rigid material pre-shaped in accordance to the shape of the mould cavity, and said mould cavity is formed between said covering and the surface of the first mould section.

BRIEF DESCRIPTION OF THE DRAWINGS

Further advantages and particularities of the invention will become apparent from the following description of some particular embodiments of the process and the mould according to the invention. This description is only given by way of illustrative example and is not intended to limit the scope of the invention as defined by the annexed claims. The reference numerals used in the description refer to the drawings wherein:

DETAILED DESCRIPTION OF THE INVENTION

In the embodiment illustrated in FIGS. 1 to 5 a flexible layer shaped first part formed by a micro-cellular or non-cellular elastomeric polyurethane skin layer 6 and destined in particular for a dashboard or another interior trim part of a car is moulded in a mould starting from a polyurethane reaction mixture as disclosed for example in WO 98/14492 in the name of the present applicant. The skin layer 6 has normally an average thickness in the range of 0.1 to 3 mm and usually in the range of 0.5 to 1.5 mm whilst its density is usually higher than 400 kg/m$^3$ and preferably higher than 700 kg/m$^3$. For determining the average thickness of the skin or other layers, the volume and the surface area of the skin are measured and the volume is divided by the surface area.

Figure 1:
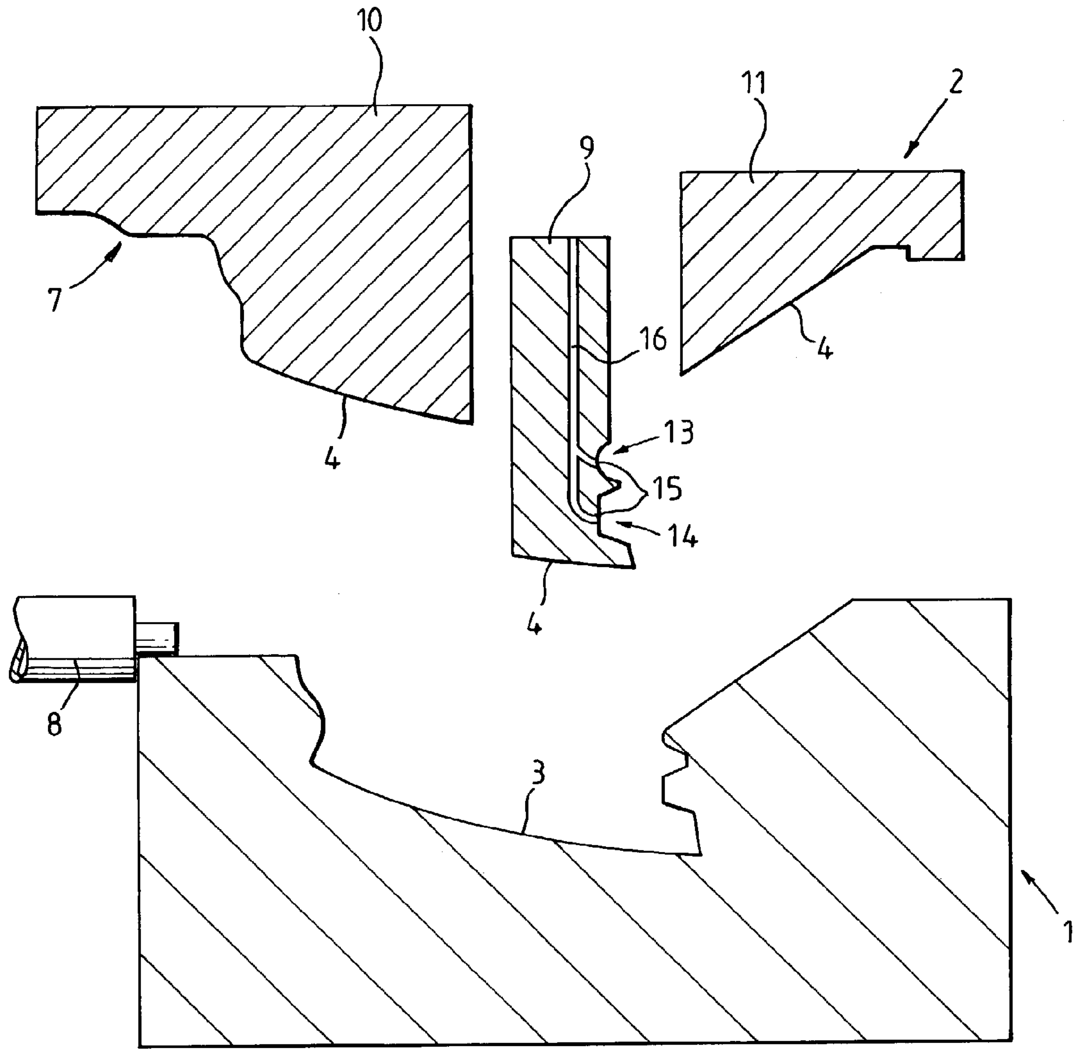
FIGS. 1 to 5 illustrate schematically, in cross-sectional views, the successive steps of the process according to a preferred embodiment of the invention.

An example of a suitable mould is shown in open position in FIG. 1 and comprises a first mould section 1 and a second mould section 2. The mould sections 1 and 2 have opposing surfaces 3 and 4 which cooperate with one another to provide a mould cavity 5 for moulding the first part therein. Between the two mould sections 1 and 2, an injection port or gate 7 is provided wherein an injection piece 8 can be inserted to inject the reaction mixture, mixed in a mixing head, into the mould cavity 5.

As can be seen in FIG. 1, the first mould section 1 shows undercuts whilst the second mould section 2 is composed of slides 9–11 in order to enable to close the mould. In case the mould section 1 shows no undercuts or only minor undercuts which may be entirely filled with the reaction mixture, the second or upper mould section 2 may be formed by one piece. Of course, the second mould section 2 may also be formed by one piece in case the lower mould section 1 is made of different movable pieces (see for example FIG. 9). In the illustrated example, the surface 3 of the first mould section 1 is intended to form the front side of the moulded skin 6 and may therefore be textured to provide a skin with a certain texture, for example a leather texture.

In the process illustrated in FIGS. 1 to 5 for moulding the skin layer 6, the surface 3 of the first mould section 1 may first be coated with an external release agent. Subsequently, an inmold paint or coating, forming a surface finishing layer, can optionally be sprayed onto this mould surface. However the polyurethane compositions disclosed in WO 98/14492 are light stable so that no paint coating is required to avoid discolorations. After having applied the necessary coatings onto the first mould section, a removable flexible covering made of a flexible elastically deformable sheet material 12 is applied between the two mould sections 1 and 2 (see FIG. 2). The sheet material 12 can be laid loosely over the first mould section 1 but is preferably tensioned somewhat over this first mould section 1.

Figure 2:
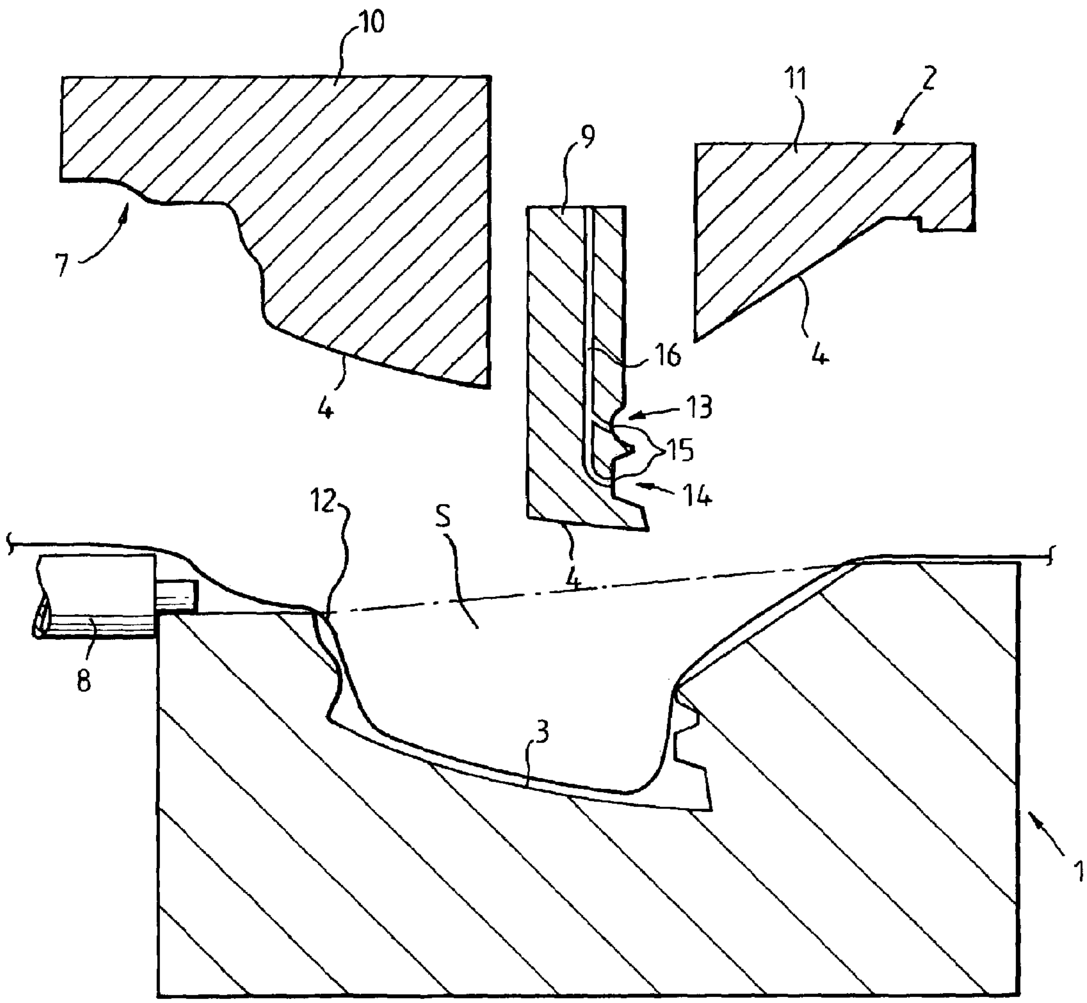
Figure 3:
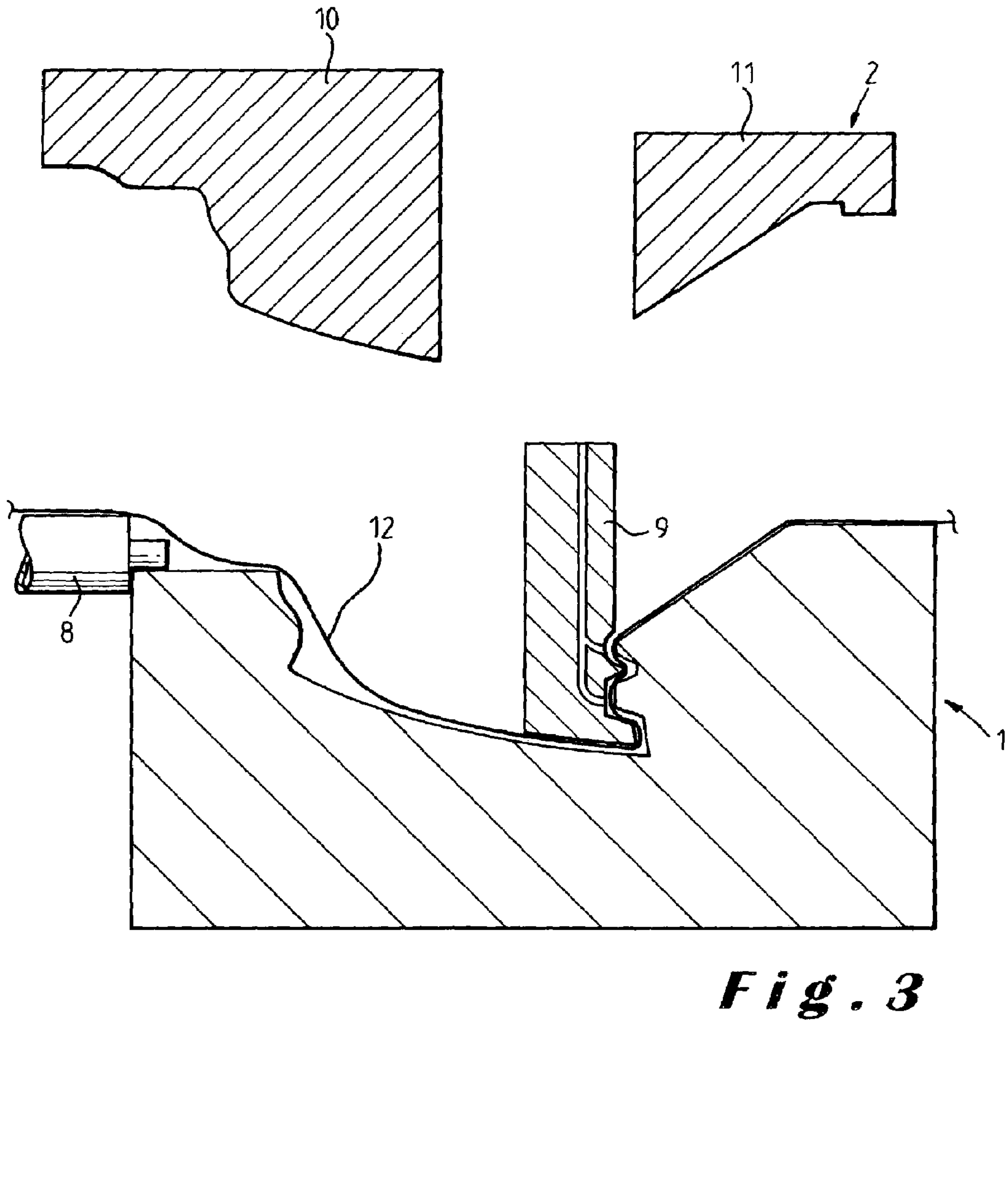

As can be seen in FIG. 2, the sheet material 12 is pre-shaped to conform at least generally to the shape of the mould cavity. In this way, compared to a flat sheet material, less or even no stretching of the sheet material is required to deform the sheet material to the shape of the mould cavity 5 so that more moulding cycles can be performed without having to replace the sheet material 12. The sheet material is preferably pre-shaped so that when positioned into the first, concave mould section 1, the space S occupied or delimited by the sheet material in the first mould section is larger than 50%, preferably larger than 70% and most preferably larger than 80%, of the space occupied by this sheet material in the first mould section after having brought the sheet material into the shape of the mould cavity as explained hereinafter.

Figure 4:
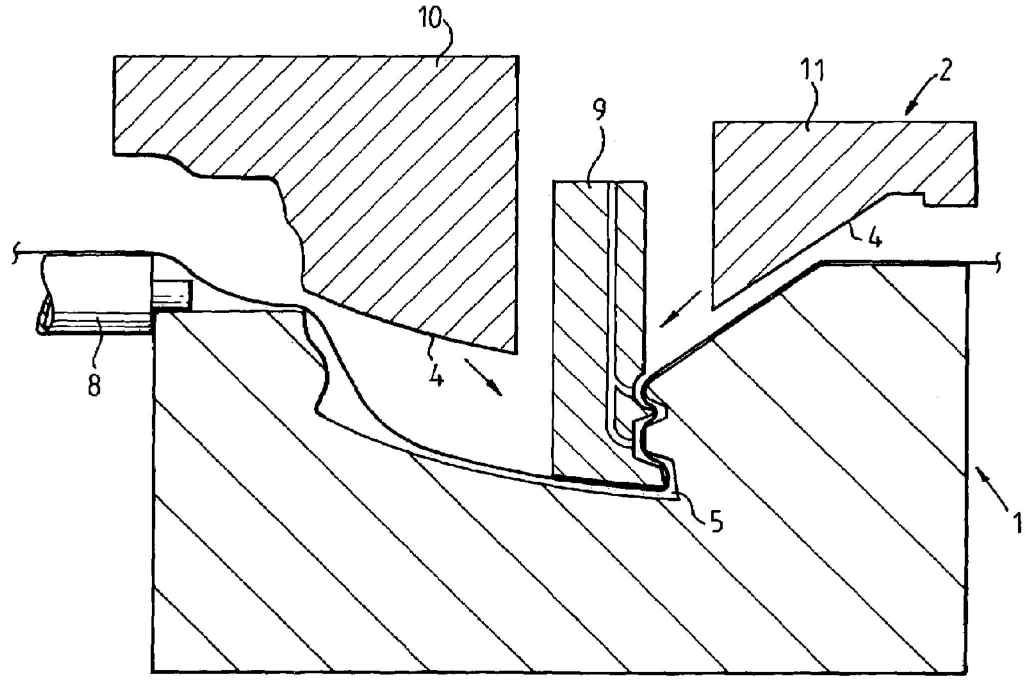

After having positioned the sheet material 12 onto the first mould section, the mould is closed by moving first the slide 9, which is arranged to co-operate with the undercuts in the first mould section 1, towards this latter mould section (see FIG. 3) and subsequently the other slides 10 and 11 (see FIGS. 4 and 5). The mechanism provided for enabling these successive movements has not been illustrated in the figures since it is known per se by the skilled person.

When use is made of a covering 12 made of a rather thin, flexible sheet material, folds may be formed in this sheet material. In order to avoid as much as possible the formation of such folds when closing the mould, the sheet material 12 is preferably elastically stretched to conform to the shape of the mould surface 4 when closing the mould. The formation of folds in the sheet material 12 is indeed to be avoided, especially in case of rather thin skins 6, since at the location of folds, weakened lines will be formed in the skin 6, more particularly lines where the skin shows a reduced tear resistance.

Figure 5:
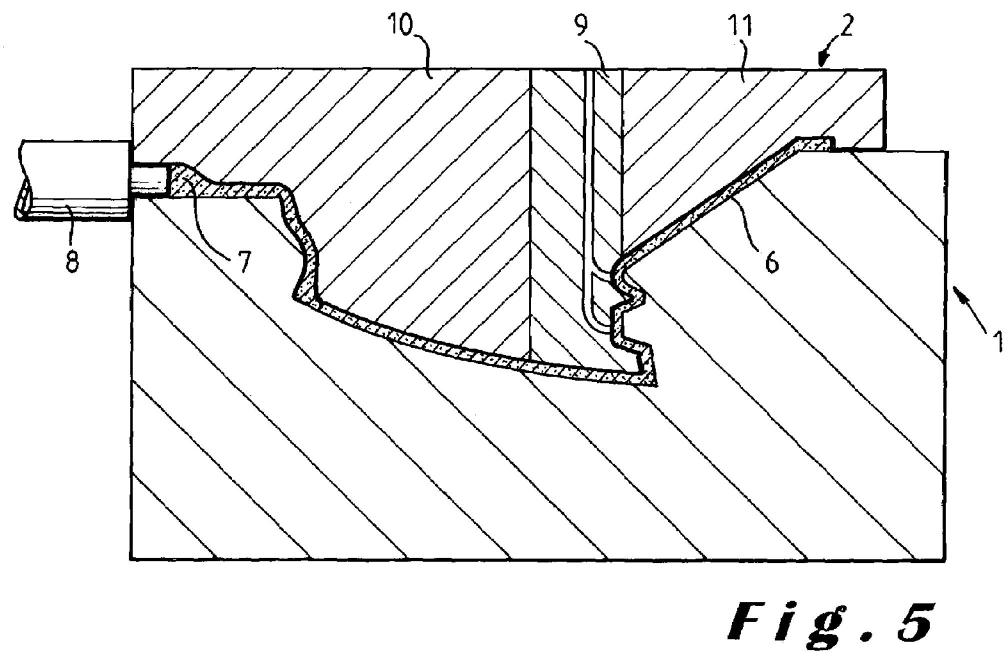

Turning now to FIG. 5, the polyurethane reaction mixture is injected in a next step through the injection piece 8 and the gate 7 in the mould cavity 5, more particularly between the sheet material 12, which covers the second mould section 2, and the surface 3 of the first mould section 1. The reaction mixture is then allowed to cure to form the elastomeric skin 6. The mould can subsequently be opened by raising the slides 9 to 11 again and the elastomeric skin 6 can be removed from the mould. Before removing the skin 6 from the mould, the covering 12 can first be removed from the back thereof. However, it is also possible to leave the covering 12 on the back of the moulded skin 6 when removing this skin from the mould. In this way, it is easier to remove the skin from the mould without damaging it so that it can also be removed earlier from the mould to reduce the cycle time. After having removed the covering from the back of the skin, it can be positioned again onto the mould. Of course, use can be made of a number of coverings so that one covering is always available for being positioned in the mould.

In the above-described process according to the invention, it is advantageous that the sheet material 12 engages the surface of the second mould section 2 as completely as possible so that the moulded part shows exactly or nearly exactly the shape of the mould cavity 5. The sheet material 12 should engage the mould surface 4 in particular also in concave portions of the second, generally convex mould section 2, more particularly in the recesses 13 and 14 in the slide 9.

Depending on the stretchability of the sheet material 12 and the shape of the mould surface 4, this can be achieved first of all by the pressure at which the reaction mixture is injected in the mould cavity 5 and by any pressure generated during the reaction of the reactive mixture, especially when this mixture contains a small or a larger amount of blowing agents like water.

Should this pressure not be enough, the second mould section 2 could be provided with small holes connected to a vacuum channel and arranged to suck the sheet material 12 under vacuum against the mould surface 4. Applying a vacuum will however usually not be necessary and has therefore not been shown in the drawings. Instead, only a few vent holes 15 connected to an outlet channel 16 were provided in order to avoid the formation of air bubbles behind the sheet material 12, especially in the concave portions or recesses 13, 14 in the second mould section 2.

An advantage of the above-described process is that it enables to keep the back side of the elastomeric skin 6 free of external release agents. In this way, the adherence of a backing layer, which has normally to be applied against the back of the elastomeric skin 6, is not adversely affected by the presence of external release agent.

A further advantage of the above-described process is that the reaction mixture injected in the mould cavity 5 is prevented by the sheet material 12 from penetrating between the slides 9–11 of the second mould section 2. In this way, these slides require less cleaning and the formation of burrs on the back of the moulded part is avoided so that it is no longer necessary to remove such burrs from the moulded parts.

The backing layer or second layer shaped part which will be applied against the back of the skin layer 6 may be a rigid carrier formed in situ against the back of the skin starting from a polyurethane reaction mixture by a RIM or spray process or starting from a thermoplastic material by an injection process. A preformed rigid carrier can however also be adhered to the back of the elastomeric skin by means of glue. In practice the backing layer applied against the back of the skin layer is usually preferably a foam layer, against the back of which a rigid carrier can further be applied. In this way, a skin with a soft touch feeling can be achieved.

Such a backing foam layer, in particular a polyurethane foam layer can be applied by a spray process as disclosed in WO 93/23237, or by a RIM process as disclosed in EP-B-0 386 818. In this latter case, the reaction mixture for the foam layer is injected more particularly between the skin and a rigid carrier, which are both positioned in the mould before injecting the reaction mixture. On the other hand, the foam backing layer could also be produced by a RIM process in accordance with the present invention, more particularly by positioning a previously produced elastomeric skin against a first mould section and a sheet material against a second mould section and by injecting the polyurethane reaction mixture for producing the foam layer by the reaction injection process between the skin and the sheet material. Against the back of the foam layer, a rigid carrier has then to be applied either after having removed the sheet material or without removing the sheet material. Applying the carrier can be done as described hereabove by a RIM or a spray process or by gluing a previously produced carrier against the back of the foam layer. In this case also, a good adhesion can be obtained between the first layer shaped part, now formed by the foam layer, and the second layer shaped part, due to the absence of any release agent on the back of the foam layer as a result of the use of the sheet material. In this embodiment, the skin layer which is applied in the mould before moulding the foam layer therein is a kind of surface finishing layer. Instead of being composed of one layer, this finishing layer may also be a composite layer formed for example by a paint coating and an elastomeric skin layer.

With respect to a paint coating, it should be noted that due to its small thickness in the order of magnitude of 5 to 50 $\mu$m, such a coating is not a structural layer or layer shaped part of the composite made in accordance with the process of the present invention and can thus not be considered as a second layer shaped part. According to a particular embodiment of the invention, the second layer shaped part, applied against the back of the first layer shaped part, should have more particularly a thickness of at least 0.5 mm and preferably a thickness of at least 1 mm.

As described hereabove with reference to the drawings, the layer shaped first part produced in the process according to the invention may be first of all a micro-cellular or non-cellular elastomeric polyurethane skin layer 6. This skin layer may be produced in particular by a RIM process or possibly also for example by a pouring proces wherein the reaction mixture is poured or sprayed onto the first mould section before the sheet material is applied over this first mould section. In a variant embodiment, the reaction mixture injected in the mould cavity 5 could however also be formulated to produce a cellular polyurethane moulded layer shaped part as the first part comprising a micro-cellular or non-cellular elastomeric polyurethane skin layer, in other words an integral skin. On the other hand, the reaction mixture could further be formulated to produce a polyurethane foam layer as the first part. In this latter embodiment, a finishing layer is preferably first applied in the mould against the first mould section 1 in order to form the visible or front side of the moulded composite as describe already hereinbefore.

In the embodiment illustrated in FIGS. 1 to 5, a relatively thin pre-shaped flexible sheet material was used as covering for the second mould section. This sheet material was elastic enough to return to its initial flat shape when it is removed from the second mould section so that it can be used for several mouldings. The used sheet material was a pre-shaped membrane which may have an average thickness in the range of from about 100 $\mu$m to about 20 mm and more particularly in the range of from about 150 $\mu$m to about 10 mm. Such a membrane may for example be a silicone, latex or TPU membrane and may adapt itself to the shape of the surface 4 of the second mould section 2 when applying it over this mould surface 4. As mentioned already hereabove, an advantage of such membranes is that they can be used for several successive mouldings since they are not or almost not plastically deformed during the moulding process. As illustrated in FIGS. 1 to 5, they can be applied, in particular stretched over the first, concave mould section before closing the mould or, alternatively, one could also consider to fix them around the second, convex mould section so that, when opening the mould, they remain fixed to the second mould section. When producing the membranes, they are pre-shaped to conform at least generally to the shape of the mould. Usually, the first mould part 1 against which the front side of the first part 6 is moulded is generally concave. In this case, the expression "pre-shaped to conform at least generally to the shape of the mould" means that also the membranes show a concave shape. By being pre-shaped, they need less or even substantially no stretching to follow the shape of the mould surface compared to a completely flat sheet material. Pre-shaping the membranes therefore increases the life thereof.

Figure 6:
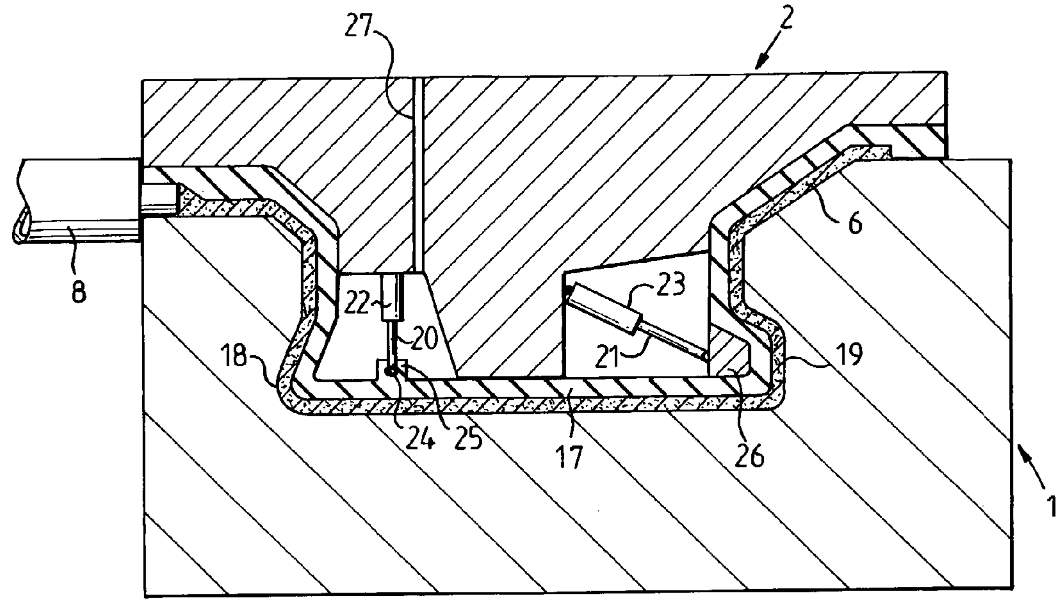
FIG. 6 shows a schematic cross-sectional view of a variant embodiment of the mould illustrated in FIGS. 1 to 5, more particularly with extended maintaining means.
Figure 7:
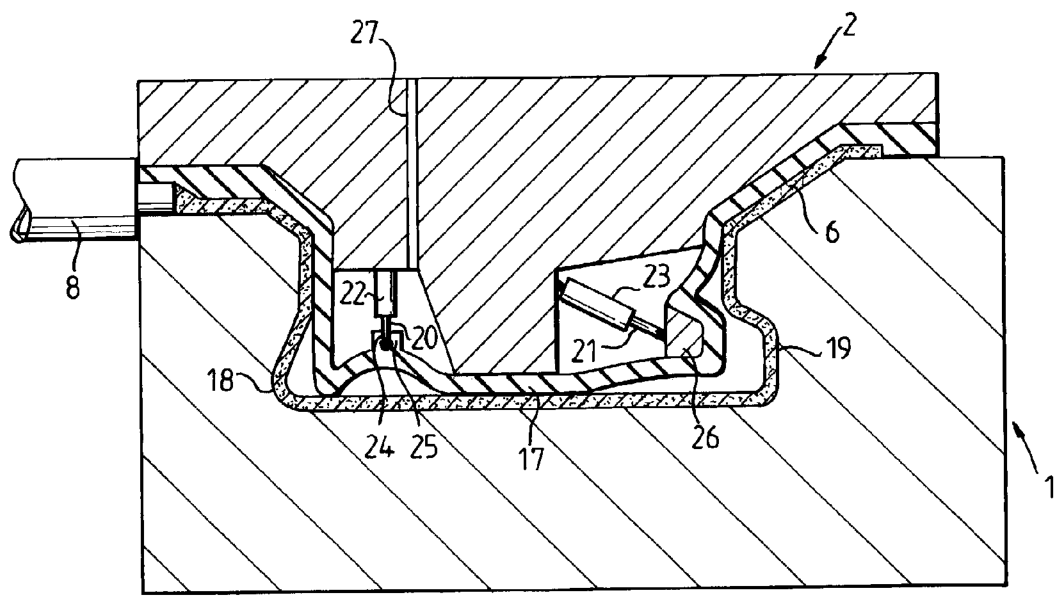
FIG. 7 shows a view analogous to the view of FIG. 6 but showing the maintaining means in their retracted position.

FIGS. 6 and 7 illustrate the alternative embodiment wherein a relatively thick pre-shaped membrane 17, having for example a thickness of about 4 mm, is used as covering for the surface of the second mould section 2 and is more particularly fixed thereto. In this embodiment, the membrane is pre-shaped in accordance to the shape of the mould cavity. A remarkable feature of the shown embodiment is that the membrane 17 is locally maintained on a distance from the surface 4 of the second mould section 2 so that the mould cavity 5, or in other words the shape of the first part which is to be moulded therein, is defined at least partially by the shape of the membrane 17. An advantage thereof is that the thickness of the moulded part can for example be reduced at the location of so-called undercuts 18, 19 in the first mould section 1 without having to use slides in the second mould section 2. This is shown in FIG. 6 wherein the illustrated mould is provided at the location of the two undercuts 18 and 19 with means for maintaining the membrane 17 on a distance from the surface 4 of the second mould section 2. In both cases, these means comprises a piston element 20, 21 that is movable between an extended and a retracted position in a hydraulic or pneumatic cylinder 22, 23. The free extremity of the piston 20 is provided with a head 24 by means of which it is fixed in a recess in a thickened portion 25 of the membrane 17 whilst the free extremity of the piston 21 is provided with a stamp 26 supporting in its extended position the membrane 17 in the undercut 19.

Both pistons 20 and 21 are fixed to the membrane 17 and are arranged to withdraw the membrane 17, in their retracted positions, out of the undercuts before demoulding the first part. This movement is illustrated in FIG. 7. Due to the fact that the membrane 17 is elastically deformable, it will return to its initial position or state, illustrated in FIG. 6, when the pistons 20, 21 are extended again.

In the area's next to the thickened portion 25 or the stamp 26, the rigidity of the membrane 17 may be sufficient to maintain the desired mould cavity shape when injecting the reaction mixture. In the embodiment shown in FIGS. 6 and 7, a source of pressurised fluid is however provided and a channel 27 for feeding that fluid between the surface 4 of the second mould section 2 and the membrane 17 in the area in front of the undercut 18. In this way, an additional support is provided. The support of the membrane 17 provided by the pressurised fluid may even be large enough to omit the piston-cylinder mechanism 20, 22. In the case that this mechanism is omitted, a source of vacuum for withdrawing said fluid from between the surface 4 of the second mould section 2 and the membrane 17 can be provided to withdraw the projecting membrane 17 out of the undercut 18.

Figure 8:
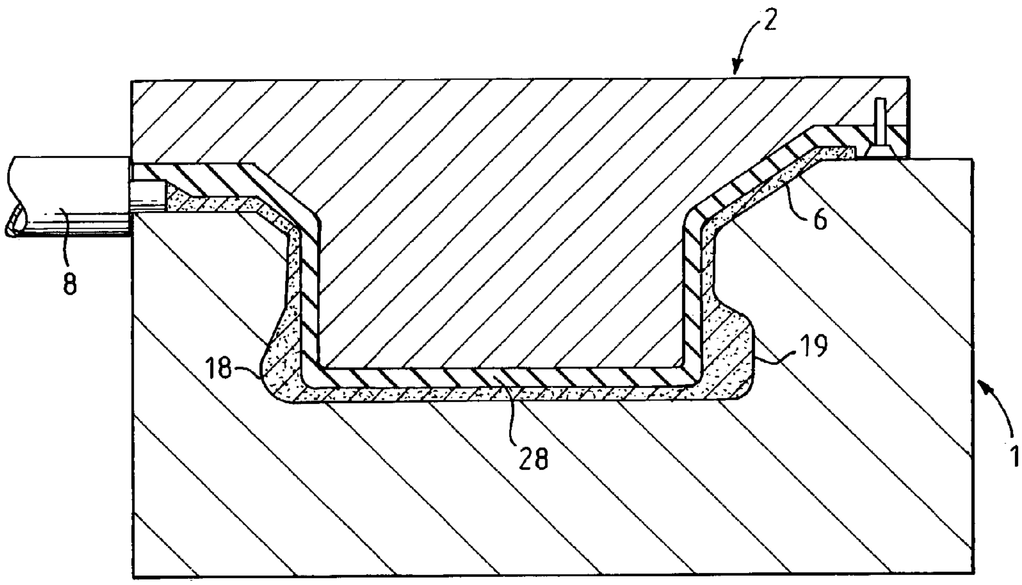
FIGS. 8 and 9 show schematic cross-sectional views of further variant embodiments of the mould according to the invention, one section of which is covered with a rigid removable covering.
Figure 9:
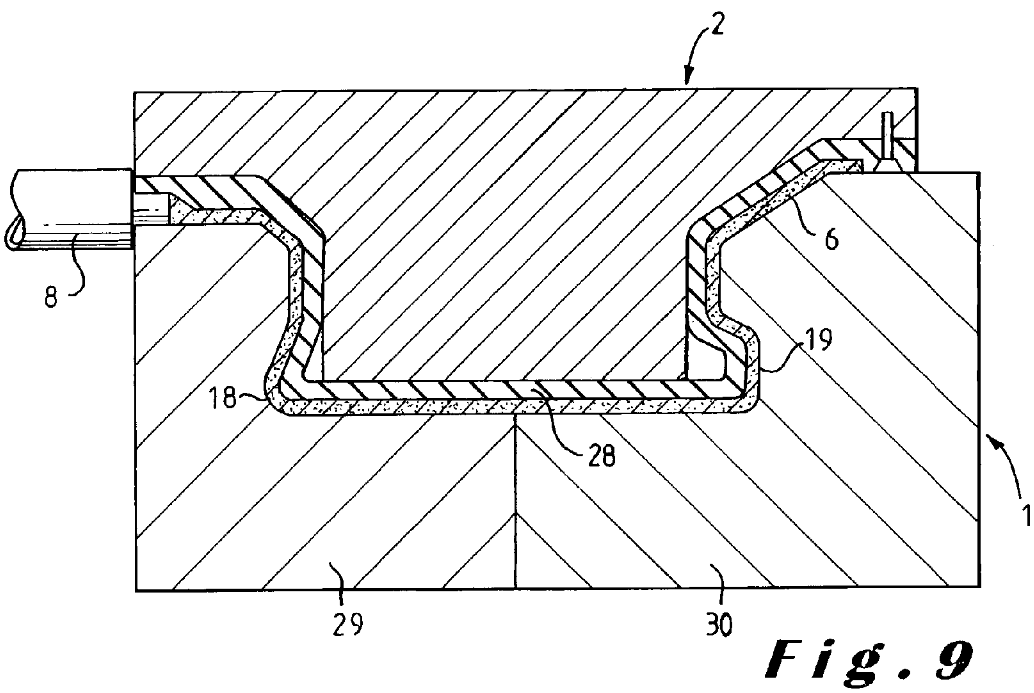

Instead of a flexible, pre-shaped membrane use can also be made in the process according to the invention of a removable covering 28 made of a rigid non-stick material such as polypropylene (PP), polyethylene (PE), etc. The rigid non-stick material may also be a composite material comprising for example a rigid metallic or plastic shell covered with a non-stick coating layer, for example a Teflon (PTFE), PP or PE coating layer. This embodiment is illustrated in FIGS. 8 and 9. Due to the rigidity of the covering 28, the moulded first part 6 shows, in FIG. 8, a larger thickness in the area of the undercuts 18 and 19. As illustrated in FIG. 9, this can however be avoided by using a rigid covering following also in the area of the undercuts the contour of the lower mould section 1. In this case, the lower mould section is composed of two mould pieces 29, 30 to enable to demould the first part. When the covering is rigid enough, it does not have to be supported by the upper mould section 2 so that this second mould section 2 does not have to consist of different slides as in the embodiment of FIGS. 1 to 5. If it is not rigid enough to resist the pressure of the reaction mixture, the thickness of the rigid covering can be increased to contact the second mould section also in the area of the undercuts 18 and 19.

According to another alternative embodiment of the invention, the same advantages as described hereabove can be achieved by covering at least the second mould section 2 with a permanent non-stick coating layer instead of with a removable flexible covering 12. In this embodiment, the permanent non-stick coating layer adheres of course not to the moulded part, even when no external release agent is applied thereto. The non-stick coating layer enables thus to avoid the use of an external release agent and even the use of internal release agents. In other words, the reaction mixture may be free or substantially free of internal release agents.

The non-stick coating layer may be made of different synthetic materials adhered to the metal mould surface. Use can be made in particular of PP, PE or Teflon (PTFE), the exact composition of which can be adapted by the person skilled in the art to the specific requirements of the moulding process.

In a preferred embodiment, the non-stick coating is not only applied to the second mould surface but also at least partly to the lateral sides of the slides 9–11 which engage one another in the closed position of the mould. In this way, due to the softer nature of the synthetic nonstick coating compared to steel, an effective seal is achieved between the slides 9–11 so that the reaction mixture is prevented from penetrating therebetween and so that the formation of burrs is thus avoided.

From the above description of some particular embodiments of the process according to the invention, it will be clear that many modifications can be applied thereto without departing from the scope of the invention as defined in the appended claims.

In the embodiment shown in FIGS. 6 and 7, the covering or membrane 17 could for example be supported centrally in the bottom of the second mould section 2 by means of one single piston-cylinder mechanism 20, 22. In this case, the membrane should be designed in such a manner that, in the extended position of the piston, the membrane 17 extends with is both lateral sides in the undercuts 18 and 19 respectively whilst, in its retracted position, the piston withdraws both lateral sides of the membrane out of the undercuts.

What is claimed is:

1. A process for the production of a moulded, layer shaped first part (6) comprising a micro-cellular or non-cellular elastomeric polyurethane skin layer having a front side and a back side and an average thickness of between 0.1 and 3 mm, which process comprises the steps of:

providing a first mould section (1) defining a first mould surface (3) having a generally concave shape to form a mould cavity showing at least one undercut (18, 19);

closing said mould cavity by means of a second mould section (2) which has a second surface (4) situated opposite the first mould surface (3), the second surface (4) being provided with a removable non-stick covering of a flexible sheet material (12, 17) to form, opposite the first mould surface (3), a second mould surface which extends into said undercut (18, 19) and which defines, together with said first mould surface, the closed mould cavity;

applying a polyurethane reaction mixture for producing said first part (6) into the mould cavity (5), the back side of the first part (6) being formed against said flexible sheet material (12, 17);

allowing the reaction mixture to cure to obtain said first part (6); and opening the mould and removing the first part from the mould and from the covering of the second mould section, characterised in that said covering is made of an elastically deformable sheet material (17) which is fixed to the second mould section and pre-shaped to conform at least generally to the shape of said second mould surface, the covering being maintained at least at the location of said undercut (18, 19) on a distance from the surface (4) of the second mould section (2) so that it extends into said undercut when the polyurethane reaction mixture is allowed to cure in the mould cavity (5).

2. A process according to claim 1 wherein the covering is withdrawn out of the undercut (18, 19) before opening the mould.

3. A process according to claim 1 characterised in that said covering is maintained at least at the location of said undercut (18, 19) on said distance from the surface (4) of the second mould section (2) by feeding a pressurised fluid between this surface (4) and the covering.

4. A process according to claim 3, characterised in that said covering is withdrawn out of the undercut (18, 19) by withdrawing said fluid from between the surface (4) of the second mould section (2) and the covering.

5. A process according to claim 1 wherein the sheet material (17) of the covering is pre-shaped to conform to the shape of said second mould surface.

6. A process according to claim 1, characterised in that a second part is formed in situ against the back side of the first part (6).

7. A process according to claim 6, characterised in that said second part has an average thickness of at least 0.5 mm.

8. A process according to claim 1 characterised in that said elastically deformable sheet material (17) is formed by an elastically deformable membrane having an average thickness in the range of from about 100 $\mu$m to about 20 mm.

9. A process according to claim 1, characterised in that, before applying said reaction mixture, a surface finishing layer, which is optionally a composite layer, is applied against the surface (3) of the first mould section (1) and said reaction mixture is applied in said mould cavity (5) between this surface finishing layer and said covering.

10. A mould for use in a process according to claim 1 and comprising at least first (1) and second co-operating mould sections (2), the first mould section (1) defining a first mould surface (3 having a generally concave shape to form a mould cavity (5) showing at least one undercut (18, 19), the second mould section (2) being arranged to close the mould cavity and showing a second surface (4) situated opposite the first mould surface (3) and provided with a removable non-stick covering of a flexible sheet material (12, 17) to form, opposite the first mould surface (3) a second mould surface which extends into said undercut (18, 19) and which forms, together with said first mould surface (3), the closed mould cavity, which mould cavity is arranged to mould said first part therein, characterised in that the surface (4) of the second mould section (2) is covered with a covering of an elastically deformable sheet material (17) which is fixed to said second mould section and pre-shaped to conform at least generally to the shape of said second mould surface, the mould comprising means for maintaining said covering at least at the location of said undercut (18, 19) on a distance from the surface (4) of the second mould section (2) so that it extends into said undercut (18, 19) when the first part is moulded in the mould cavity (5), which maintaining means comprise a source of pressurised fluid and a channel (27) for feeding that fluid between the surface (4) of said second mould section (2) and the covering.

11. A mould according to claim 10 characterised in that it comprises a source of vacuum for withdrawing said fluid from between the surface (4) of said second mould section (2) and the covering.

12. A mould for use in a process according to claim 1 and comprising at least first (1) and second co-operating mould sections (2), the first mould section (1) defining a first mould surface (3) having a generally concave shape to form a mould cavity (5) showing at least one undercut (18, 19), the second mould section (2) being arranged to close the mould cavity and showing a second surface (4) situated opposite the first mould surface (3) and provided with a removable non-stick covering of a flexible sheet material (12, 17) to form, opposite the first mould surface (3) a second mould surface which extends into said undercut (18, 19) and which forms, together with said first mould surface (3), the closed mould cavity, which mould cavity is arranged to mould said first part therein, characterised in that the surface (4) of the second mould section (2) is covered with a covering of an elastically deformable sheet material (17) which is fixed to said second mould section and pre-shaped to conform at least generally to the shape of said second mould surface, the mould comprising means for maintaining said covering at least at the location of said undercut (18, 19) on a distance from the surface (4) of the second mould section (2) so that it extends into said undercut (18, 19) when the first part is moulded in the mould cavity (5), which maintaining means comprise an element (20, 21) fixed to said second mould section (2), which element (20, 21) is movable between an extended and a retracted position with respect to said second mould section (2).

13. A mould according to claim 12, characterised in that said element (20, 21) is fixed to said covering.

14. A process according to claim 1, wherein the polyurethane reaction mixture for producing the first part is applied into the mould cavity by a reaction injection moulding process.

15. A process according to claim 6, wherein the second part is formed in situ against the back side of the first part by a spray or by an injection or by a reaction injection moulding process.

16. A process according to claim 8 wherein said elastically deformable membrane has an average thickness in the range of from about 150 μm to about 10 mm.

* * * * *